Patented Dec. 18, 1945

2,391,019

UNITED STATES PATENT OFFICE 2,391,019

SAPONIFICATION PROCESS

Sabine Hirsch, Minneapolis, Minn., assignor to Cargill, Incorporated, Wilmington, Del., a corporation of Delaware No Drawing. Application December 20, 1943, Serial No. 514,971

17 Claims. (Cl. 252—369)

This invention relates to processes for production of saponified products such as soaps from synthetic fatty acids produced by oxidation of relatively high molecular weight hydrocarbons which are solid or liquid at normal temperature and pressure, and more particularly to processes for producing saponified products from synthetic fatty acids obtained in accordance with my co-pending application Ser. No. 455,937 filed August 24, 1942, and Ser. No. 500,005 filed August 25, 1943.

In my co-pending applications which are incorporated herein by reference, there are described processes of oxidation of relatively high molecular weight hydrocarbons, liquid or solid at normal temperature and pressure, wherein such a hydrocarbon or hydrocarbon mixture is heated to 80–150° C., preferably to 110–130° C., and oxidized by blowing through it air or oxygen containing gas mixture in the presence of a catalyst of the type of the "siccatives," a small percentage of a persalt in emulsion of an oleaginous substance and a small percentage of moisture which is carried into the reaction mass by the oxygen containing gas which is blown through. Constant stirring is obtained by mechanical equipment, and after about 12 hours of oxidation, the reaction product has reached a saponification number of about 180–200, the color of the product is almost white, its consistency, odor and saponification qualities are suggestive of the fatty acids of the cocoanut group. The so obtained reaction product contains about 80% fatty acids and the remainder is unsaponifiable material. The unsaponifiable material can easily be separated from the fatty acids before saponification, and after washing and filtering from the suspended inorganic and organic unsaponifiable substances, the fatty acids are suitable for saponification. The fatty acids, as well as the organic unsaponifiable material, are almost white, have no objectionable odor and can be used without any refining for processes requiring such materials. The residue of the catalytic substances can be used again for oxidation.

Synthetic fatty acids produced by oxidation of high molecular weight hydrocarbons by methods prior to the methods disclosed in my applications mentioned above, contained a much higher percentage of unsaponifiable material and the oxidation yielded dark-colored products having objectionable odors and saponification numbers much lower than 180–200. The dark color and especially the objectionable odor of the prior art products could be corrected only by costly refining. The separation of the unsaponifiable was made by first saponifying the product and then extracting the unsaponifiable from the resultant soap. Then the fatty acids were recovered from the soap by treatment with mineral acid and after being freed from unsaponifiable substances were further refined, either by steam or vacuum distillation and by bleaching.

It is an object of this invention to provide improved methods of saponifying synthetic fatty acids for production of light-colored and odorless soaps, using as a starting material synthetic fatty acids of high molecular weight hydrocarbons which are solid or liquid at normal temperatures and pressures, and to provide such improved soap products.

It is a further object of this invention to provide saponification products of great stability.

It is an object of the invention to provide methods of saponification for synthetic fatty acids, so that they may be saponified in the manner in which the fats of the fatty acids of the cocoanut group are saponified, viz. cold saponification.

It is also an object of the invention to provide materials and methods by which difficultly saponifiable natural fats can be made to saponify more readily and in an improved manner.

Other and further objects are those inherent in the invention herein described, illustrated and claimed.

In carrying out the invention there is utilized synthetic fatty acids which are prepared in accordance with my co-pending applications, heretofore referred to, which describe the production of fatty acids from hydrocarbons which are liquid or solid at normal temperatures. For producing fatty acids there is utilized a relatively high molecular weight hydrocarbon such as fuel oil, lubricating oil, paraffin, crude mineral wax, crude mineral oil or fractions thereof. To the selected starting material there is added a catalyst of the class of "siccatives" customarily used as oxidation or polymerization catalysts with paints, varnishes, and the like, for example, metallic salts such as zinc, manganese, cobalt, lead or other heavy metal, stearates, oleates, palmitates, linoleates and other materials as described in my co-pending applications. The siccative is used in a range from 0.05% to 3.0% and may be added directly to the selected starting ingredient or may be added by way of an emulsion, as specified. To the selected starting ingredient there is also added a persalt having as a cation an alkali such as potassium, sodium or the like, or ammonium, an alkaline earth such as calcium, barium or strontium, or a multivalent metal such as magnesium, manganese, cobalt, iron, zinc, copper or the like. As the anion of the persalt there may be used the permanganates, perborates, perchlorates, perchromates, persulphates and similar persalt anions. The persalt ingredient is carried in an emulsion composed of water, an oleaginous substance and a small amount of sodium or potassium soap, or soap produced from my synthetic fatty acids. In the emulsion there is carried the persalt which is used in an amount ranging from 0.05% to 3.0%, based upon the amount of hydrocarbon starting material utilized. The heavy metal soap previously mentioned, may likewise be dissolved in the emulsion or may be dissolved directly in the hydrocarbon starting material as desired.

The hydrocarbon starting material is heated to a temperature of 80–150° C., preferably 100–130° C., and to it there is added the siccative and the emulsion containing the persalt, these being preferably added in several proportions throughout the course of the oxidation, and a gas containing oxygen such as air or air enriched with oxygen or oxygen diluted with an inert gas is bubbled through the reaction mixture. The oxygen comprising gas contains a minor percentage of moisture. During the course of the oxidation the mixture is stirred and after a period of 6–24 hours a relatively large percentage of the hydrocarbon material is converted to fatty acids. Thus in a typical run after 12 hours the reaction mass contains about 80% of saponifiable matter of the fatty acid type. An average saponification number of about 200 is easily obtained after 12 hours of oxidation.

When the oxidation is interrupted, the unsaponifiable portions of the mass may conveniently be separated by permitting the temperature of the reaction mass to fall gradually, whereupon the reaction mass separates into three layers, viz. an upper layer of unsaponifiable material, a middle layer of fatty acids and a small bottom layer of the residue from the siccative and persalt ingredients. The separation is done at low temperature and without chemicals, and as a result neither the synthetic fatty acids nor the unsaponifiable material undergoes a change in structure or decomposition. Both materials remain almost white. The residue of the catalytic materials forms a thin, brownish layer at the bottom of the reaction kettle and can be easily separated.

The fatty acid layer may conveniently be separated from the unsaponifiable layer and the bottom layer by permitting the temperature of the reaction mass to fall until the top layer of unsaponifiable material solidifies. The solidification temperature of the synthetic fatty acids is lower than the solidification temperature of unsaponifiable matter and consequently the fatty acid layer may conveniently be drained away, preferably through a filter.

The separated fatty acids are almost white in coolr when they have cooled and solidified, their odor, consistency and saponification qualities are suggestive of the fatty acids of the cocoanut group, and like cocoanut oil fatty acids they may be saponified at low temperatures (viz. "cold saponification"). The characteristic of cold saponification of the fatty acids serves to differentiate them from prior synthetic fatty acids made from relatively high molecular weight aliphatic hydrocarbons. In one important property these fatty acids made by my process are superior to the natural fatty acids from cocoanut oil, this property being that of greater stability.

The fatty acids so produced and recovered have a saponification number in the neighborhood of 200–220, and after being washed can easily be saponified by themselves or mixed with natural fatty acids, fats and oils. A small percentage of unsaponifiable material still remains in the fatty acids, but it can be left with them, because this unsaponifiable material is white in color, has no odor but possesses good emulsifying and antioxidant properties.

The fatty acids are now ready for soap manufacturing. In carrying out the saponification, there is utilized alkali hydroxide or carbonate solutions, preferably sodium or potassium hydroxide or carbonate solution having a concentration of 15–30%, at a temperature above 20° C., but below 100° C., preferably a temperature in the range of 20°–60° C. Saponification may also be carried out under conditions and temperatures of "cold saponification," customarily used for the saponification of cocoanut oil. When saponification of the synthetic fatty acids or mixtures containing such acids is carried out utilizing sodium or potassium carbonate, good lathering, white soaps, free from odor are obtained. Saponification with the corresponding hydroxides when carried out in the absence of "protective agents," hereinafter described, yield good lathering soaps having a color ranging from tan to brown and having the odor and appearance of rosin soap. Where color and odor are of relatively little importance, as where the soap is used in lubricants etc., saponification with the hydroxides and in the absence of said protective agents may be utilized.

By use of appropriate protective agents, fine, white or cream-colored soaps, free from odor may be obtained even when utilizing alkali hydroxide. Thus, the synthetic fatty acids may be saponified with alkali hydroxide, for example sodium or potassium hydroxide, without discoloration of the resultant soap by adding about 1–5%, preferably 2%, of a water soluble oxidizing salt, preferably a perborate, to the melted fatty acid or fatty acid-containing mixture prior to saponification, or a somewhat greater percentage of such agent may be used after saponification as a color corrective and filler. In place of alkali perborate, for the water soluble oxidizing salt there may be utilized an equivalent amount of alkali bisulphite, alkali peroxide or other water soluble persalt, customarily used for soap-bleaching purposes. The perborates are desirable from the standpoint of effectiveness, cost, and freedom from any need for after treatment, and because they produce a stabilizing effect on the soap.

After saponification any of the usual and well-known soap builders and fillers may be crutched into the soap, if desired, as well as any perfume or coloring matter for tinting the soap. As exemplary filler materials there may be mentioned perborates, silicates, pyro- or triphosphates, potassium chloride, sodium chloride, potash, borax, sodium carbonate etc. Thus, an additional amount of perborate may be crutched into the finished soap as a filler material, alone or together with other filler materials. Such later additions of water soluble oxidizing agents serve to rectify any discoloration which may have resulted due to poor control or due to the use of excessive temperatures or excessive alkali during saponification, and such materials, which act also as fillers, enhance the detergent properties of the resultant soap. The finished soap is worked up in the usual ways and may be dried in any approved method, for example by spray or drum drying, if desired.

The synthetic fatty acids, utilized as starting material in the present invention, may be mixed in any desired percentage with natural fats, oils or fatty acids, and may likewise be used as a substitute for cocoanut oil to facilitate saponification of difficultly saponifiable natural fats and oils and to improve their lathering effect. Thus, the addition of a relatively small percentage of synthetic fatty acids to a difficultly saponifiable material such as tallow renders the tallow very easily saponifiable and gives the resultant soap improved lathering properties. Where alkali hydroxide is necessary for the saponification of the natural fat or oil content of a mixture of synthetic fatty acids and such natural fat or oil, discoloration of the synthetic fatty acid soap produced in the mixture may be prevented by adding to the reaction mixture a small amount of water soluble oxidizing salt as a protective agent, all as heretofore described. Thus, a water soluble persalt may be added to the mixture of synthetic fatty acids and natural fat or oil and thoroughly stirred until a homogeneous mass is obtained and then the saponification may be accomplished either by an appropriate amount of hydroxide or a mixture of hydroxide and carbonate, without development of color or odor.

Discolored natural fats or fatty acids having objectionable odor, when saponified together with my synthetic fatty acids in the aforesaid ways, lose their objectionable odor, and have much improved color, sometimes white, depending upon the degree of discoloration of the original natural material.

In carrying out the saponification, whether by cold saponification procedure or by semi-boiling procedure, the usual precautions customarily observed in the saponification of cocoanut oil are likewise observed in regard to the temperature of the melted fat, temperature of the alkali solution, thorough crutching, filling the frames, covering the frames etc.

In general, it may be stated that the synthetic fatty acid soaps have excellent detergent properties, even when used in hard water or salt water, and extend the benefits of such properties to mixtures wherein the synthetic fatty acid soaps are present along with soaps prepared from natural fats or fatty acids.

Having thus described in general the features of the invention, reference is made to the examples given hereinafter which illustrate specific and desirable modes of proceeding and the resultant products. These examples should not however be considered as limiting the invention.

In carrying out the invention the fatty acid is first produced. This may be accomplished as set forth in my copending applications, the methods of which are illustrated by Example I. It is to be understood, of course, that any of the procedures set forth in my aforementioned applications which are incorporated here by reference, may be utilized for the production of the synthetic fatty acid starting material.

Example 1

Six hundred (600) parts of paraffin having a melting point of 52–55° C. were melted and heated to 110° C. in a covered reaction kettle having an inlet tube at the bottom for blowing air through the reaction mass in finely dispersed bubbles, a mechanical stirrer and an outlet pipe leading to a water cooled condenser for the collection of volatile products driven off in the process.

An emulsion was separately prepared by melting together 25 parts of synthetic fatty acids from a previous run (or as prepared in accordance with my co-pending applications), 15 parts of fatty acids from beef tallow, 0.3 part potassium stearate and 0.25 part potassium permanganate in 50 parts of hot water. These ingredients were thoroughly stirred until a homogeneous mixture was obtained.

To the melted and heated paraffin there were now added 3 parts zinc stearate and half of the emulsion, prepared as indicated, and the mass was stirred for a while until a homogeneous mixture was obtained. Then the temperature was raised to about 125° C., and air was blown through in excess. The air carried about 2% moisture. When the saponification number of the reaction mass had reached 100 (in about 5–6 hours), the other half of the emulsion and another 3 parts of zinc stearate were stirred into the reaction mass and the other conditions being maintained until a saponification number of 180–200 was reached. This was obtained in about 12 hours.

The reaction product was almost white, and had a consistency, odor and saponification qualities like those of fatty acids of the cocoanut group.

In order to separate the unsaponifiable from the saponifiable material the temperature in the reaction kettle was lowered to a point where the fatty acids remain melted and the unsaponifiable solidifies. In this case it was somewhat below 42° C. Three layers were formed, viz. an upper solidified layer contained the unsaponifiable organic substances; a middle layer contained the melted fatty acids; and a thin layer in the bottom of the kettle, this thin layer being a brownish mass of residues from the various catalysts.

The fatty acids were drawn off through a filter, washed with water, or if desired by dilute mineral acid and then with water, to separate water soluble substances, and the fatty acids were then ready for saponification. Their color was almost white, they were free from odor, and had a saponification number of 200. The fatty acids contained about 6% unsaponifiable matter, but this was unobjectionable, being snow white in color and having no smell whatsoever.

These synthetic fatty acids were used in the following examples for making various kinds of soaps:

COLD PROCESS SOAPS

Example 2

One hundred (100) parts of synthetic fatty acids were melted, and at a temperature not much higher than their melting point, a quantity of 20% sodium carbonate solution having a temperature of 25° C. and sufficient to neutralize the fatty acids, was gradually poured into the melted fatty acids with constant and thorough stirring. Combination soon took place. When the soap mass became thicker and perfectly homogeneous, a solution of filler material having a temperature of 40° C. and a concentration of 25% and containing 10% sodium silicate, 10% sodium perborate and 10% potassium carbonate, based upon the weight of the anhydrous soap in the mass, was crutched into the soap and the soap mass was worked up and then transferred to frames which were covered in order to prevent rapid cooling off. If desired, perfumed material may be crutched into the soap at the same time the filler material is added. After cooling off and drying by spray or drum drying to the desired percentage moisture, there was obtained a very good lathering, white soap, free from odor. The same soap may be prepared without filler material, if desired.

*Example 3*

One hundred (100) parts of synthetic fatty acids were melted and 2% sodium perborate in saturated aqueous solution was added and the mixture was stirred until a homogeneous mass was obtained. A 20% solution of sodium hydroxide having a temperature of 25° C. and containing sufficient sodium hydroxide to neutralize the synthetic fatty acids, was then gradually poured into the melted fatty acid perborate mixture. Combination soon took place. The soap was worked up as in Example 2, the added filler material being composed of 10% borax, 5% potassium carbonate and 10% sodium silicate, based upon the weight of the anhydrous soap present in the soap mass. The filler material was dissolved in a 25% solution (40° C.) and was crutched into the soap mass. After being worked up and dried to the desired moisture content, there resulted a very good lathering, white soap, free from any odor.

*Example 4*

One hundred (100) parts of synthetic fatty acids were melted and into the melted fatty acids there was gradually poured a 20% solution of sodium hydroxide, the amount of such solution being sufficient to neutralize the fatty acids present. Reaction soon took place and the resultant soap was worked up as in Example 2. Without filler materials being added, the soap was a light tan and had the appearance and odor of rosin soap. The lathering and detergent properties were excellent. If desired, filler material such as that described in Examples 2 and 3 may be added, in which case the color of the soap is white.

*Example 5*

One hundred (100) parts of synthetic fatty acids, containing 2% borax, in a saturated solution, and 50 parts of beef tallow were melted and mixed together, and at a temperature of about 35° C., a 25%, 25° C., sodium carbonate solution, sufficient to saponify the fatty acids was poured in, in order to saponify the synthetic fatty acids. Then a 25%, 25° C., sodium hydroxide solution, sufficient to saponify the tallow, was stirred in. When the soap had become thicker and quite homogeneous, it was tested for the presence of free fatty acids and natural fat and alkali. When alkali is present, it may be neutralized by adding the requisite amount of stearic acid, while if free fatty acids are present, these may be neutralized by adding the required amount of sodium carbonate. In the event free natural fat is present, this may be saponified by adding an appropriate quantity of sodium hydroxide. A filler material, composed of 10% borax, 10% sodium pyrophosphate, 5% potassium carbonate and 5% sodium silicate in 25% solution, was crutched into the soap and the resultant mass transferred to frames and worked up as in Example 2. If desired, perfume may be added at the time the filler material is crutched into the soap. The resultant soap had excellent lathering qualities and was white and free from any odor other than that which is characteristic of good quality, pure soap.

*Example 6*

One hundred (100) parts of synthetic fatty acids containing 2% borax, in saturated solution, and 50 parts olein were melted together and saponified as in Example 5. When worked up, using a filler material as in Example 2, a very good lathering soap of white color was obtained. The soap was free from objectionable odor.

*Example 7*

One hundred (100) parts of synthetic fatty acids containing 2% borax, by weight of the fatty acids, in saturated solution, were melted together with 50 parts of soyabean oil and saponified as in Example 5 using the stearic fatty acids for final neutralization of any excess alkali present. When worked up, using a filler material as in Example 2, an excellent white soap of good lathering qualities, free from odor was obtained.

*Example 8*

One hundred (100) parts of synthetic fatty acids containing 2% borax were melted together with 50 parts of peanut oil, and at a temperature of 28–30° C., a quantity of 25% sodium hydroxide solution, sufficient to neutralize the fatty acids and to saponify the peanut oil, was gradually poured into the fat mass with constant and thorough stirring. Reaction soon took place. The soap was tested for alkali, free fatty acids and natural fat, and the necessary adjustments made, as in Example 5, for completion of the reaction. The soap was worked up, as in Example 5, and there resulted a good quality, white soap, having excellent lathering properties. The soap was free from any odor other than that characteristic of good quality, high grade soap.

If desired, the sodium hydroxide used for neutralization of the synthetic fatty acids and for saponification of the peanut oil, may be replaced by a mixture of sodium hydroxide and sodium carbonate solutions, preferably 25%. The amount of sodium carbonate used is sufficient to neutralize the synthetic fatty acids present in the mixture, and the amount of sodium hydroxide solution used is chosen sufficient to saponify the peanut oil. The resultant soap is white, free from odor and has good lathering qualities.

If an absolute white color is not of primary importance, the 2% borax added to the synthetic fatty acids prior to the saponification reaction, may be eliminated. If discoloration occurs during saponification, this can be corrected by adding to the filler material or by itself, a small percentage of perborate or usual soap-bleaching agents.

SEMI-BOILED SOAPS

*Example 9*

Fifty (50) parts of synthetic fatty acids and 50 parts of beef tallow fatty acids were melted together and at a temperature not much higher than their melting point were poured into a 20% solution of sodium carbonate, 60–70° C., sufficient to neutralize the fatty acid mixture, with constant and thorough stirring. When all the carbonic acid gas was expelled and saponification finished, the soap was worked up as in Example 2 and after drying there resulted a very good lathering, white soap, free from any odor.

Example 10

One hundred (100) parts of synthetic fatty acids and 50 parts of soyabean oil were mixed together and at a temperature not much higher than the melting point of the mixture, the fatty acids were neutralized with a solution of potassium carbonate (20%; 25° C.), the amount of such solution being sufficient to neutralize the synthetic fatty acids present in the mixture. The temperature of the mixture was then raised to 40–60° C. and the soyabean oil was saponified with potassium hydroxide (25%; 40° C.), the mixture being thoroughly stirred during the process. When the mixture became homogeneous, a solution of filler material having a concentration of 25% and containing 10% each of potassium carbonate, potassium silicate and potassium chloride, based upon the weight of the anhydrous soap present in the mixture, was then crutched into the soap and the soap mass was worked up in the usual manner. A very good soft soap resulted.

In place of soyabean oil there may be substituted olive oil, olive oil foots, sesame oil, linseed oil or the like with excellent results.

Example 11

One hundred (100) parts of synthetic fatty acids and 20 parts of stearic acid were melted together and at a temperature of about 30° C., a 20% sodium carbonate solution, sufficient to neutralize the fatty acids, was gradually poured into the fatty acids with constant and thorough stirring. Reaction soon took place, and while constantly stirring, the temperature was raised to about 60–70° C., until all the carbonic acid gas was expelled. The soap was filled and worked up as in Example 10, and there resulted a very white soap, free from any odor. The soap had good lathering qualities.

Example 12

One hundred (100) parts of synthetic fatty acids and 100 parts of tallow fatty acids were melted together and at a temperature not much higher than their melting point were poured into a 25% sodium carbonate solution, sufficient to neutralize the fatty acids, which was heated to a temperature of about 60–70° C. Saponification, filling and working up was as in the preceding example. A very good lathering, white soap, free from objectionable odor was obtained.

Example 13

One hundred (100) parts of synthetic fatty acids, containing 2% borax in saturated solution were mixed with 50 parts of beef tallow and held at a temperature of 35° C. A quantity of 25% sodium carbonate solution, sufficient to neutralize the fatty acids, was heated to about 60–70° C. and poured into the melted mixture of fatty acids and tallow with constant and thorough stirring. When the evolution of carbonic acid gas had ceased, a quantity of 25% sodium hydroxide solution, sufficient to neutralize the tallow was heated to 60–70° C. and was added to the soap mass with constant and thorough stirring. When the soap mass had become thicker and homogeneous, it was tested for alkali, free fatty acids and neutral fat, and final corrections made. After the final corrections were made, the soap mass was worked up by crutching in a solution of filler material having a concentration of 25% and composed of 10% borax, 10% sodium silicate and 5% sodium carbonate, based upon the weight of anhydrous soap in the mass. The soap mass was worked up as in the previous examples, and there resulted a white soap, having good lathering qualities. The soap was free from any objectionable odor.

Example 14

The synthetic fatty acids may be used as a substitute for cocoanut oil in the production of "stock soap" or "kettle soap" as follows:

Twenty-five (25) parts of synthetic fatty acids and 100 parts of beef tallow were mixed together and heated to a temperature not much higher than their melting point. A quantity of 25% soda ash solution, sufficient to neutralize the synthetic fatty acids present in the mixture, was then run into the fat mass with constant and thorough stirring, and the temperature maintained until the synthetic fatty acids were neutralized. The temperature was then raised to about 80–100° C. and 25% sodium hydroxide solution, in an amount sufficient to saponify the tallow, was run into the reaction mass while thoroughly stirring. When the saponification was finished and the test showed no free fatty acid or natural fat, the soap was salted out and worked up as desired in any soap formula.

Example 15

The soda ash of the preceding examples may be replaced by sodium hydroxide, and the mixture of synthetic fatty acids and tallow may be saponified in one operation with sodium hydroxide solution as follows:

Twenty-five (25) parts synthetic fatty acids, emulsified with a saturated sodium perborate solution, containing an amount of sodium perborate equal to 2% of the weight of the synthetic fatty acids, was mixed with 100 parts of beef tallow and the mixture heated to a temperature of 60–100° C. 25% sodium hydroxide solution was then run in while thoroughly stirring, the quantity of such solution being sufficient to neutralize the synthetic fatty acids and saponify the tallow present in the fat mass. The resultant stock soap was then salted out and was suitable for working up in any desired soap formula.

For stock soap, the percentage of synthetic fatty acids used with the tallow may be widely varied.

MARINE SOAPS

Example 16

One hundred (100) parts of synthetic fatty acids were melted, and at a temperature not much higher than their melting point there was poured into the fatty acids a 20% solution containing sodium hydroxide and potassium carbonate in the proportion of 2 to 1. The temperature of the hydroxide-carbonate solution was about 25° C. and enough of the solution was used to saponify the fatty acids present. The solution was poured into the melted fatty acids with constant stirring, and the temperature was raised until all the carbonic acid gas was expelled, that is to say, no further gas bubbles appeared at the surface of the mass. When saponification was finished, a solution of filler material (25% concentration; 40° C.) containing 10% sodium silicate, 5% potassium carbonate and 10% sodium perborate, based upon the amount of anhydrous soap present in the mass, was crutched into the soap and the mass was transferred to frames equipped so as not to be too rapidly cooled. After the soap was dried to the desired percentage of water, there resulted very good lathering soap, easily soluble in salt water.

Example 17

Eighty (80) parts of synthetic fatty acids and 20 parts rosin were mixed together and saponified as in Example 16, utilizing for purposes of saponification a solution (25% concentration; 40° C.) containing sodium hydroxide and potassium carbonate in the ratio of 3 to 1. The resultant soap was worked up as in the preceding example and was an excellent lathering soap when used in salt water.

Washing tests utilizing the soap of either of Examples 16 and 17 showed excellent cleansing of soiled clothes when the soaps were used in salt water.

In general it may be stated that the soaps produced in accordance with the present invention have excellent detergent properties, even when utilized in hard water, as indicated by washing tests. Thus, washing tests utilizing soap solutions of 0.2-0.3% in hard water, at a temperature of 60-70° C. yielded fresh, clean-smelling products, even though the washing was carried out by hand for only a few minutes.

As many apparently widely different embodiments of this invention may be made without departing from the spirit and scope thereof, it is to be understood that I do not limit myself to the specific embodiments herein except as defined by the appended claims.

What I claim is:

1. A method of soap making utilizing synthetic fatty acids prepared by heating a high molecular weight hydrocarbon to an elevated temperature such that the hydrocarbon is liquefied, with catalytic amounts of an oxidation catalyst, a persalt of an alkaline reacting cation and an emulsion while dispersing throughout the reaction mass a gas comprising oxygen and a minor percentage of moisture, which comprises reacting said synthetic fatty acids with an alkali solution at a temperature in the range of 20°-100° C.

2. A method of soap making utilizing synthetic fatty acids prepared by heating a high molecular weight hydrocarbon to an elevated temperature such that the hydrocarbon is liquefied, with catalytic amounts of an oxidation catalyst, a metal persalt and an emulsion while dispersing throughout the reaction mass a gas comprising oxygen and a minor percentage of moisture, which comprises reacting said synthetic fatty acids with an alkali solution at a temperature in the range of 20°-100° C. and in the presence of a water soluble oxidizing salt.

3. A method of soap making utilizing synthetic fatty acids prepared by heating a high molecular weight paraffinic hydrocarbon to an elevated temperature and such that the hydrocarbon is liquefied, with catalytic amounts of an oxidation catalyst and a metal persalt in the presence of a water containing emulsion, while dispersing throughout the heated liquid hydrocarbon a gas comprising oxygen and a minor percentage of moisture so as to form an emulsion of the reaction mass during the whole time of the process of oxidation, which comprises reacting the synthetic fatty acids so produced with an alkali solution at a temperature above 20° and not substantially exceeding 100° C.

4. A method of soap making utilizing synthetic fatty acids prepared by heating a high molecular weight paraffinic hydrocarbon to an elevated temperature and such that the hydrocarbon is liquefied, with catalytic amounts of an oxidation catalyst and a metal persalt in the presence of a water containing emulsion, while dispersing throughout the heated liquid hydrocarbon a gas comprising oxygen and a minor percentage of moisture so as to form an emulsion of the reaction mass during the whole time of the process of oxidation, which comprises reacting the synthetic fatty acids so produced with an alkali solution at a temperature above 20° and not substantially exceeding 100° C. and in the presence of a water soluble oxidizing salt.

5. A method of soap-making utilizing synthetic fatty acids prepared by heating a high molecular weight paraffinic hydrocarbon to a temperature such that, if the hydrocarbon is normally solid it will be liquefied, said temperature being not substantially in excess of 150° C., and intimately mixing with the heated liquid hydrocarbon catalytic amounts of a heavy metal soap and a persalt of an alkaline reacting cation, the latter at least being carried by an emulsion of water, an oleaginous material and an emulsifying agent, simultaneously dispersing throughout the reaction mass a gas comprising oxygen and containing a minor percentage of moisture, which comprises reacting said synthetic fatty acids with an alkali at a temperature above 20° C., but below 100° C.

6. The process of claim 1 further characterized in that said alkali is a carbonate solution.

7. The process of claim 1 further characterized in that the reaction with an alkali is effected in the presence of a small percentage of soap-bleaching material.

8. The process of claim 1 further characterized in that the reaction with the alkali is effected in the presence of a small percentage of perborate.

9. The process of claim 1 further characterized in that said synthetic fatty acids are mixed with natural fatty acids prior to reacting with the alkali.

10. The process of claim 1 further characterized in that said synthetic fatty acids are mixed with natural fatty acids and said mixture of fatty acids reacted with an alkali carbonate.

11. The process of claim 1 further characterized in that said synthetic fatty acids are mixed with natural fatty acids and said mixture of fatty acids reacted with an alkali in the presence of a small percentage of soap-bleaching material.

12. The process of claim 1 further characterized in that said synthetic fatty acids are mixed with a natural fat and with a small percentage of soap-bleaching material, and said mixture reacted with an alkali.

13. The process of claim 1 further characterized in that said synthetic fatty acids are mixed with a natural fat and with a small percentage of a water soluble oxidizing salt and said mixture reacted with an alkali.

14. The process of claim 1 further characterized in that said synthetic fatty acids are mixed with a natural fat and said mixture reacted with a solution containing sufficient alkali carbonate to neutralize said synthetic fatty acids and containing sufficient alkali hydroxide to saponify said natural fat.

15. The process of claim 1 further characterized in that said synthetic fatty acids are mixed with natural fat and a small percentage of a water soluble perborate, said mixture being reacted with an alkali.

16. The process of claim 1 further characterized in that said synthetic fatty acids are mixed with a natural fat, said mixture then being reacted with an aqueous solution containing sufficient alkali carbonate to neutralize the synthetic fatty acids present in the mixture at a temperature not greatly exceeding the melting point of said mixture, and then at an elevated temperature further reacting the mixture with an aqueous solution containing sufficient alkali hydroxide to saponify the natural fat present in said mixture.

17. The process of claim 1 further characterized in that said synthetic fatty acids are mixed with a natural fat and with a small percentage of water soluble oxidizing salt, then, at a temperature not greatly exceeding the melting point of the mixture, reacting the mixture with a solution containing sufficient alkali carbonate to neutralize the synthetic fatty acids present in said mixture and at an elevated temperature continuing said reaction with a solution containing sufficient alkali hydroxide to saponify said natural oleaginous material.

SABINE HIRSCH.